(12) United States Patent
Yamamoto (10) Patent No.: US 7,284,460 B2
(45) Date of Patent: Oct. 23, 2007

(54) BALANCER

(75) Inventor: Hiroaki Yamamoto, Hirakata (JP)

(73) Assignee: Akazawa Machine Co., Ltd., Osaka (JP)

( * ) Notice: Subject to any disclaimer, the term of this patent is extended or adjusted under 35 U.S.C. 154(b) by 0 days.

(21) Appl. No.: 10/415,972

(22) PCT Filed: Dec. 3, 2001

(86) PCT No.: PCT/JP01/10530

§ 371 (c)(1),
(2), (4) Date: May 2, 2003

(87) PCT Pub. No.: WO02/46641

PCT Pub. Date: Jun. 13, 2002

(65) Prior Publication Data

US 2004/0003677 A1    Jan. 8, 2004

(30) Foreign Application Priority Data

Dec. 7, 2000   (JP) .............................. 2000-373071

(51) Int. Cl.
*F16F 15/16* (2006.01)
*F16C 15/00* (2006.01)
*B24B 41/00* (2006.01)
*B23B 5/22* (2006.01)

(52) U.S. Cl. .................. 74/573.1; 74/572.2; 74/574.3; 451/343; 279/103

(58) Field of Classification Search ............... 74/572, 74/573 R, 574, 573.1, 572.2, 574.3; 409/141, 409/234, 131, 233; 279/9.1, 103; 451/343, 451/342; B24B 45/00; F16F 15/131; B23Q 11/00
See application file for complete search history.

(56) References Cited

U.S. PATENT DOCUMENTS 430,270 A * 6/1890 Cook ........................ 74/570.2

(Continued)

FOREIGN PATENT DOCUMENTS

JP      52-141385      10/1977

(Continued)

OTHER PUBLICATIONS

Translation of Japanese Utility Model 11-201233, PTO 06-1784, Jan. 2006.*

(Continued)

*Primary Examiner*—Vinh T. Luong
(74) *Attorney, Agent, or Firm*—Jordan and Hmaburg LLP (57) ABSTRACT

A weight 4 which is held by a weight holder 3 in a balancer has a pressing face 4*b*' which is pressed against a guide face 12*a* provided along the circumferential direction of rotation of the weight holder 3 by centrifugal force generated by rotation of a rotary body. When the rotary body rotates, the weight 4 which is pressed against the guide face 12*a* via the pressing face 4*b*' changes its position relative to the rotary body in the circumferential direction of rotation, whereby the weight 4 is disposed in a position in which it suppresses whirling motion of the rotary body. The guide face 12*a* and pressing face 4*b*' are inclined relative to the axial direction of rotation so as to tend to outward side in the diametrical direction of rotation as tending to one side in the axial direction of rotation. The weight 4 is pressed against a receiving portion 7*a*' by component of the centrifugal force, in which the component acts along the guide face 12*a* and pressing face 4*b*'.

13 Claims, 10 Drawing Sheets

U.S. PATENT DOCUMENTS

| | | | | |
|---|---|---|---|---|
| 1,305,978 | A * | 6/1919 | Spence | 74/570.2 |
| 3,736,811 | A * | 6/1973 | Neary | 74/573 R |
| 4,021,051 | A * | 5/1977 | Toyomoto et al. | 279/9.1 |
| 4,714,389 | A * | 12/1987 | Johne | 409/233 |
| 4,721,423 | A * | 1/1988 | Kubo | 409/234 |
| 4,865,336 | A * | 9/1989 | Keritsis | 279/9.1 |
| 5,074,723 | A * | 12/1991 | Massa et al. | 409/131 |
| 5,125,777 | A * | 6/1992 | Osawa | 409/234 |
| 5,322,304 | A * | 6/1994 | Rivin | 279/103 |
| 5,746,647 | A * | 5/1998 | Huang | 451/343 |
| 6,186,712 | B1 * | 2/2001 | Senzaki | 409/234 |
| 6,471,453 | B1 * | 10/2002 | Winebrenner et al. | 409/141 |

FOREIGN PATENT DOCUMENTS

| | | | | |
|---|---|---|---|---|
| JP | 55-72937 | * | 6/1980 | 74/573 R |
| JP | 63-297837 | | 12/1988 | |
| JP | 06-198564 | | 7/1994 | |
| JP | 11-201233 | * | 7/1999 | |
| JP | 11-294528 | | 10/1999 | |
| JP | 2000-102211 | | 4/2000 | |
| JP | 2001-101779 | | 4/2001 | |
| JP | 2001-184777 | | 7/2001 | |
| JP | 2001-216715 | | 8/2001 | |

OTHER PUBLICATIONS

Physics, Parts I & II, Halliday & Resnick, Publisher: John Wiley & Sons, Inc., 1967, pp. 116-121.*

* cited by examiner

BALANCER

TECHNICAL FIELD

The present invention relates to a balancer for suppressing whirling motion of a rotary body, such as a spindle of a machine tool, a tool chuck for holding a tool which is attached to the spindle for performing cutting or grinding, a vehicle axle, a crankshaft of an engine and others.

BACKGROUND ART

A grinding wheel disclosed in Japanese Patent Laid-Open Publication No. H6-198564 is provided with a balancer mechanism to compensate for unbalance in weight distribution around its rotational axis. More specifically, this grinding wheel has a storage chamber and weights which are stored in the storage chamber. The inner surface of the storage chamber has a guide face which extends along the circumferential direction of rotation and wall faces disposed in one and the other of the axial directions. Each weight has a pressing face which is pressed against the guide face by means of centrifugal force generated by rotation of the grinding wheel. When the grinding wheel rotates, the weights which are pressed against the guide face via the pressing face change their positions relative to the grinding wheel in the circumferential direction of rotation, and thereby the weight are disposed in positions in which they suppress whirling motion of the grinding wheel. It is also disclosed to store liquid in the grinding wheel instead of the weights. This liquid is caused to flow when the guiding wheel rotates such that the weight distribution of the liquid is caused to vary around the rotational axis, and thus the whirling motion of the grinding wheel can be suppressed.

A rotation drive mechanism disclosed in Japanese Patent Laid-Open Publication No.2000-102211 has a weight holder integrated with the rotary body and spherical weights which are held by the weight holder in order to compensate for unbalance in the weight distribution around the rotational axis of the rotary body. A guide face having a cross section in a V-shaped groove and extending along the circumferential direction of rotation is provided in the weight holder. When the rotary body rotates, the spherical weights which are pressed against the guide face having a cross section in a V-shaped groove by centrifugal force change their positions relative to the rotary body in the circumferential direction of rotation, and thereby the weights are disposed in positions in which they suppress whirling motion of the rotary body.

When an impact acts upon the aforementioned conventional grinding wheel having the balancer mechanism, a problem arises in that the weights are fluctuated in the axial direction of rotation so that the grinding wheel vibrates, thereby leading to a reduction in grinding precision. Further, if prevention of the fluctuations of the weights in the axial direction is intended while permitting the change of their positions in the circumferential direction by means of the wall faces disposed in one and the other of the axial directions of the weight, then the wall faces should be manufactured with an extremely high degree of precision and manufacturing costs rise. Even if the wall faces are manufactured with a high degree of precision, it is impossible to completely eliminate fluctuations of the weights in the axial direction of rotation due to tolerance, and thus improvement in the grinding precision is inhibited.

When an impact acts upon the aforementioned conventional rotary body integrated with the weight holder which is provided with the guide face having a cross section in a V-shaped groove, a problem arises in that since the weights are spherical, the weights are pressed evenly against one side and the other side of the guide face in the axial direction, thus causing the rotary body to vibrate due to fluctuations of the weight.

Therefore, in a case where a work is machined by a cutting tool which is attached to the spindle of a machine tool via a tool chuck, even if the whirling motion of the tool chuck is suppressed by the conventional balancer mechanism, the amplitude thereof increases when an impact due to a reactive force, which is caused by the cutting or an external factor such as vibration of vehicles travelling nearby roads, acts upon the tool chuck via the cutting tool; with the result that improvements in the working precision are inhibited and noise is generated from the bearing of the spindle, leading to a decrease in the longevity of the bearing.

When liquid is used in place of such weights, vibration in the grinding wheel caused by the impact can be attenuated by the flow of the liquid, but liquid with a large specific gravity is expensive and difficult to handle, causing an increase in costs. If a liquid with a small specific gravity such as water is used, the balancer should be increased in size in order to achieve a desired performance.

An object of the present invention is to provide a balancer which is capable of solving the above-mentioned problems.

DISCLOSURE OF THE INVENTION

The present invention is applied to a balancer comprising a weight holder which is integrated with a rotary body and a weight which is held by the weight holder, wherein the weight holder has a guide face provided along the circumferential direction of rotation, the weight has a pressing face which is pressed against the guide face by centrifugal force generated by rotation of the rotary body, and when the rotary body rotates, the weight which is pressed against the guide face via the pressing face changes its position relative to the weight holder in the circumferential direction of rotation, and thereby the weight is disposed in a position in which it suppresses whirling motion of the rotary body.

The first characteristic of the present invention is that the guide face and pressing face are inclined relative to the axial direction of rotation so as to tend to outward side in the diametrical direction of rotation as tending to one side in the axial direction of rotation, a receiving portion which is positioned at the one side in the axial direction of rotation relative to the weight is provided on the weight holder, and the weight is pressed against the receiving portion by component of the centrifugal force, in which the component acts along the guide face and the pressing face.

As a result, the weight is pressed against the guide face which is positioned at the outward side in the diametrical direction and against the pressing face which is positioned at the one side in the axial direction by the centrifugal force, and thus fluctuations thereof in the axial direction caused by an impact acting upon the rotary body is prevented such that vibration in the rotary body caused by such an impact can be suppressed.

The second characteristic of the present invention is that a fluid material storage chamber is provided in the weight, and fluid material such as liquid, powder, or a large number of microspheres is stored in the fluid material storage chamber so as to be flowable.

As a result, whirling motion of the rotary body is suppressed by both the weight and the fluid material in the fluid material storage chamber such that vibration can be reduced;

and the fluid material moves rapidly when an impact acts upon the rotary body, and thus fluctuations are unlikely to be transmitted to the weight such that vibration can be attenuated.

The fluid material is preferably at least one of a large number of microspheres, liquid, and powder.

The third characteristic of the present invention is that an auxiliary weight storage chamber is provided in the weight, and an auxiliary weight is stored in the auxiliary weight storage chamber so as to be capable of changing its position in the circumferential direction of rotation of the rotary body.

As a result, whirling motion of the rotary body is suppressed by both the weight and the auxiliary weight in the auxiliary weight storage chamber such that vibration can be reduced.

It is preferable that the auxiliary weight storage chamber has an auxiliary guide face provided along the circumferential direction of rotation, that the auxiliary weight has an auxiliary pressing face which is pressed against the auxiliary guide face by centrifugal force generated by rotation of the rotary body, that the auxiliary guide face and auxiliary pressing face are inclined relative to the axial direction of rotation so as to tend to outward side in the diametrical direction of rotation as tending to one side in the axial direction of rotation, that an auxiliary receiving portion which is positioned at the one side relative to the auxiliary weight in the axial direction of rotation is provided on the auxiliary weight storage chamber, and that the auxiliary weight is pressed against the auxiliary receiving portion by component of the centrifugal force, in which the component acts along the auxiliary guide face and the auxiliary pressing face.

In so doing, the auxiliary weight is pressed against the auxiliary guide face which is positioned at the outward side in the diametrical direction and the auxiliary pressing face which is positioned at the one side in the axial direction by centrifugal force, and thus fluctuations thereof in the axial direction caused by an impact acting upon the rotary body can be prevented so that vibration in the rotary body caused by such an impact can be suppressed.

It is preferable that both the first and the second characteristics are comprised in the present invention. It is further preferable that both the first and the third characteristics are comprised in the present invention.

In the present invention, it is preferable that the auxiliary guide face has one end and another end in the circumferential direction of rotation, and that the distance from the auxiliary guide face to the rotational center of the rotary body gradually decreases in the circumferential direction of rotation from the two ends of the auxiliary guide face toward the central point between the two ends thereof.

In so doing, the centrifugal force which acts upon the auxiliary weight gradually decreases from the two ends of the auxiliary guide face toward the central point between the two ends thereof in the circumferential direction of rotation such that the displacement of the auxiliary weight is facilitated, and thus the auxiliary weight can be quickly positioned in a position in which it compensates unbalance in the weight distribution.

In the present invention, it is preferable that the guide face has one end and another end in the circumferential direction of rotation, and that the distance from the guide face to the rotational center of the rotary body gradually decreases in the circumferential direction of rotation from the two ends of the guide face toward the central point between the two ends thereof.

In so doing, the centrifugal force which acts upon the weight gradually decreases from the two ends of the guide face toward the central point between the two ends thereof in the circumferential direction of rotation such that the displacement of the weight is facilitated, and thus the weight can be quickly positioned in a position in which it compensates unbalance in the weight distribution.

According to the present invention, a balancer which is capable of compensating unbalance in the weight distribution around the rotational axis of a rotary body and effectively suppressing vibration caused by an impact can be provided with a simple and low-cost structure.

BRIEF DESCRIPTION OF THE DRAWINGS

FIG. 4(1) is a plan view of a weight in a balancer according to a first modified example of the present invention;

FIG. 4(2) is a front view thereof;

FIG. 4(3) is a side view thereof.

BEST MODE FOR CARRYING OUT THE INVENTION

Figure 1:
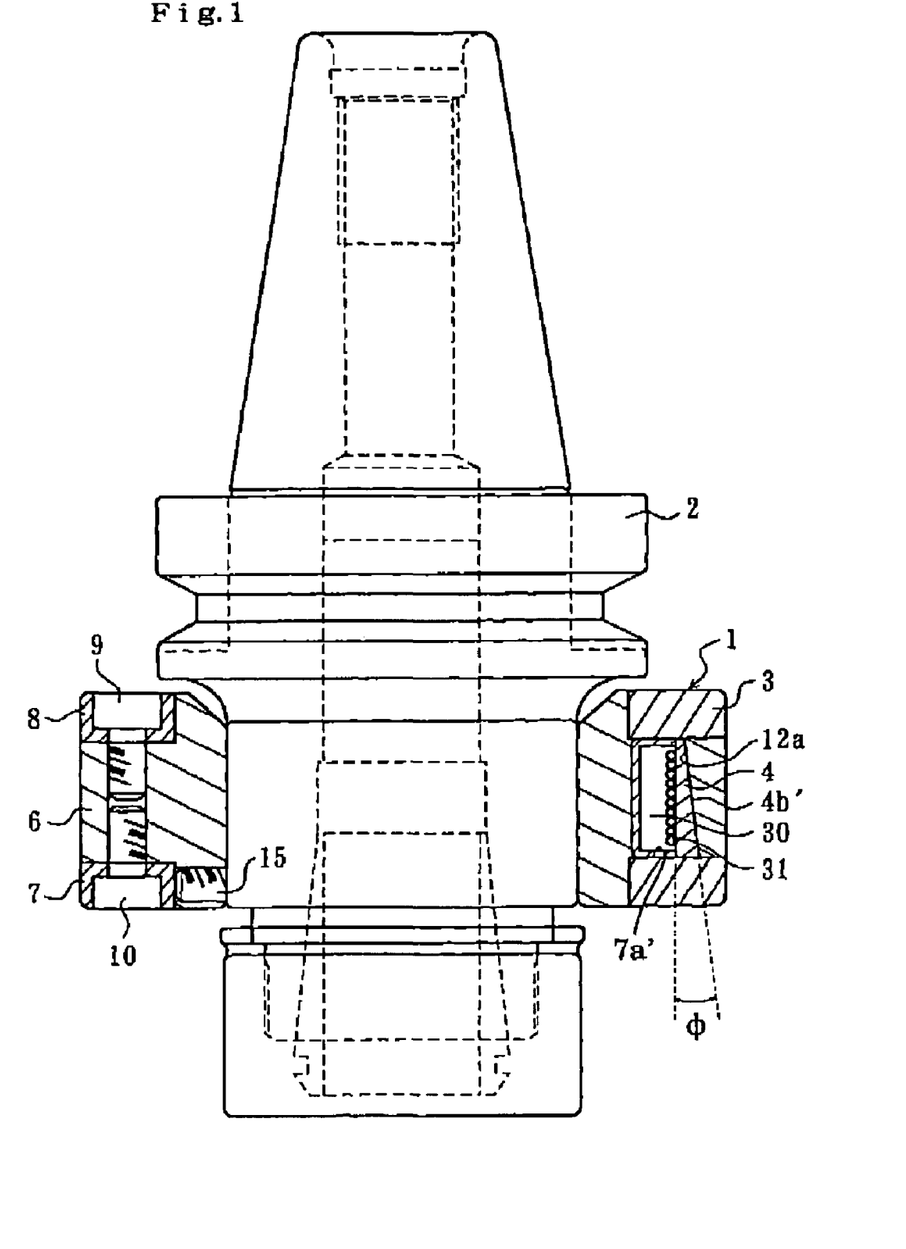
FIG. 1 is a longitudinal section of a balancer according to an embodiment of the present invention.
Figure 2:
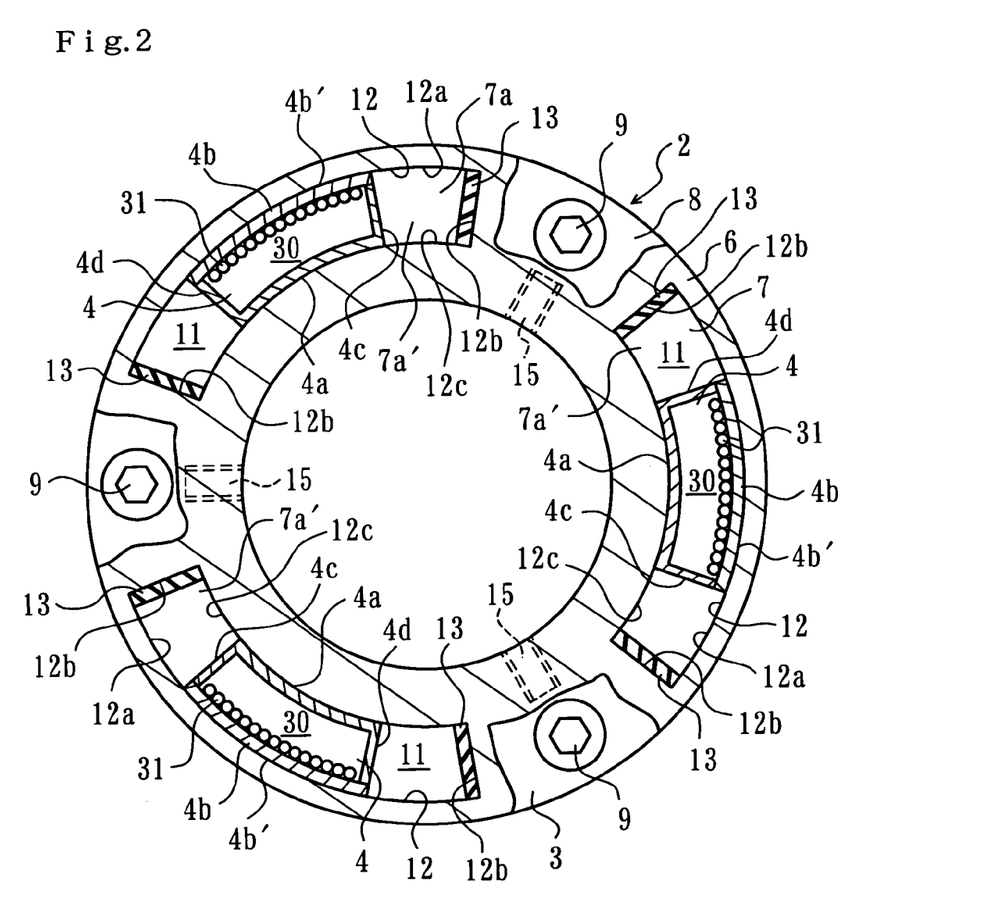
FIG. 2 is a partially cutaway plan view of the balancer according to the embodiment of the present invention.

A balancer 1 illustrated in FIGS. 1 and 2 is integrated with a tool chuck (rotary body) 2 which is attached to a spindle of a machine tool, and comprises an annular weight holder 3 which is fitted on the outer circumference of the tool chuck 2 and a plurality of weights 4 which are held by the weight holder 3. In this embodiment, the number of weights 4 is set at three, but there are no particular limitations.

Figure 3:
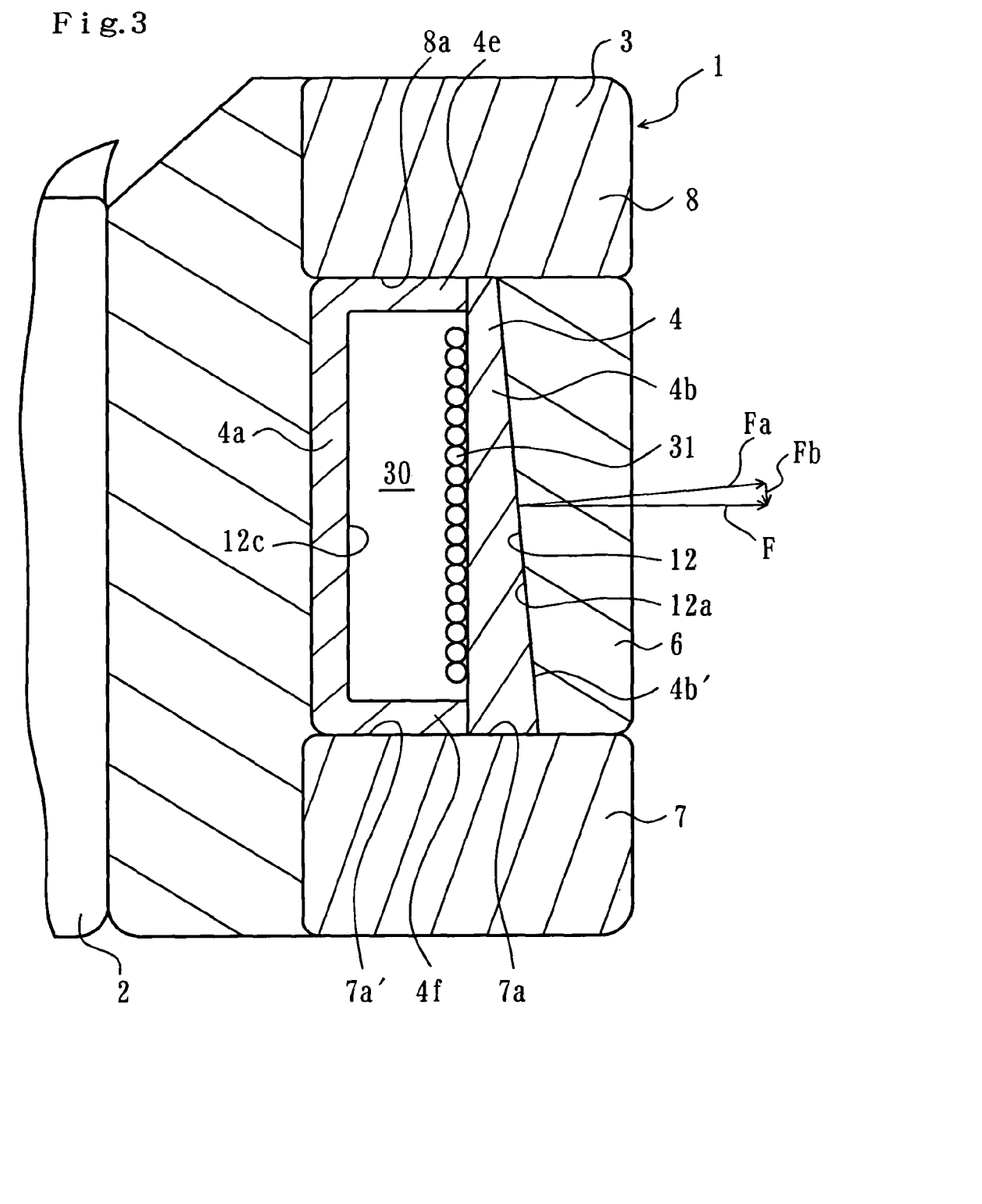
FIG. 3 is a view illustrating the action of the balancer according to the embodiment of the present invention.
Figure 4:
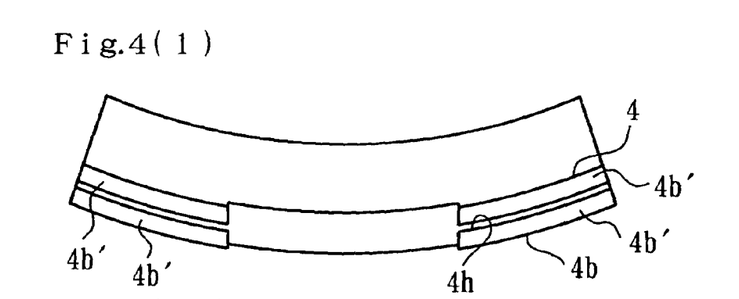

The weight holder 3 has a holding ring 6 and a pair of pinch rings 7, 8, the inner and outer circumferences of each of which extend along a cylinder side. As for the dimensions of the holding ring 6 in the axial direction, the inner side is longer than the outer side. As shown in FIG. 3, the holding ring 6 is sandwiched between the two pinch rings 7, 8 from its two end faces of the outer side. The holding ring 6 and pinch rings 7, 8 are connected by bolts 9, 10, and thus the holding ring 6 and pinch rings 7, 8 are integrated.

A plurality of spaces 11, the number of which is equal to the number of weights 4, is formed in the weight holder 3. The spaces 11 are disposed in series at equal intervals in the circumferential direction of rotation of the weight holder 3. In each space 11, the weight 4 is disposed so as to be capable of changing its position in the circumferential direction of rotation. Each space 11 is defined by the inner surface of a hole 12 opened in the two ends of the holding ring 6 and the end faces 7*a*, 8*a* of the pinch rings 7, 8. The inner face of the hole 12 comprises a guide face 12*a* provided along the circumferential direction of rotation, a face 12*c* provided along the circumferential direction of rotation inward in the diametrical direction from the guide face 12*a*, and a pair of stopper faces 12*b* which oppose each other at an interval in the circumferential direction of rotation of the weight holder 3. The guide face 12*a* in this embodiment has one end and another end in the circumferential direction of rotation, thereby forms a curved surface along an arc which is concentric with the center of rotation of the tool chuck 2. The end face 7*a* of one 7 of the pinch rings comprises a receiving portion 7*a*' facing the weights 4. In view of suppressing whirling motion by displacement of the weights 4, the difference between the dimension of the weight 4 in the axial direction and the distance between the end faces 7*a*, 8*a* of the pinch rings 7, 8 is preferably made small.

A plurality of attachment screws 15 screwed into female screw holes which pass through the inner side of the holding ring 6 in the diametrical direction are pressed onto the outer circumference of the tool chuck 2, so that the holding ring 6 is integrated with the tool chuck 2. The holding ring 6 can be integrated with the tool chuck 2 by shrink fit and others instead of the screws 15. The pinch rings 7, 8 are integrated with the holding ring 6 by the bolts 9, 10, after inserting the weights 4 into the holes 12. The holding ring 6 and one 8 of the pinch rings can be formed monolithically, and the holding ring 6 can be formed monolithically with the tool chuck 2, that is, there are no particular limitations on the form of the weight holder 3 and on the integration method thereof with the tool chuck 2 as long as these remain within the scope of the present invention.

Each of the weights 4 is a hollow hexahedron having a shape of arch when seen from the axial direction of rotation of the weight holder 3, and has inner and outer circumferential walls 4*a*, 4*b* which oppose each other at an interval in the diametrical direction of rotation of the weight holder 3, a pair of end walls 4*c*, 4*d* which oppose each other at an interval in the circumferential direction of rotation of the weight holder 3, and a pair of lateral walls 4*e*, 4*f* which oppose each other at an interval in the axial direction of rotation of the weight holder 3. The inner and outer circumferential walls 4*a*, 4*b* are provided along the circumferential direction of rotation. The surface of the outer circumferential wall 4*b* of each weight 4 comprises a pressing face 4*b*' which is pressed against the guide face 12*a* by centrifugal force generated by rotation of the tool chuck 2.

The guide face 12*a* of the weight holder 3 and the pressing face 4*b*' of the weight 4 are formed as tapered faces which are inclined relative to the axial direction of rotation so as to tend to outward side in the diametrical direction of rotation as tending to one side (downward in FIG. 1) in the axial direction of rotation. The angle of incline φ can be set appropriately in accordance with the working conditions such as the rotational speed of the tool chuck 2, the type of cutter used and others. The receiving portion 7*a*' comprised of the end face 7*a* of one 7 of the pinch rings of the weight holder 3 is positioned at the one side relative to the weight 4 in the axial directions of rotation. Alternatively, the guide face 12*a* and pressing face 4*b* can be inclined so as to tend to outward side in the diametrical direction of rotation as tending to upward-side in the drawing, and the receiving portion 7*a*' can be positioned above the weight 4 in the drawing.

The interior of each weight 4, which is hollow as described above, serves as fluid material storage chamber 30. Fluid material 31 is stored in each fluid material storage chamber 30 so as to be flowable. In this embodiment, a large number of microspheres are inserted as the fluid material 31, but another fluid material such as liquid or powder can be inserted instead.

When the tool chuck 2 rotates, the weight 4 which is pressed against the guide face 12*a* via the pressing face 4*b*' so as to be capable of relative sliding movement changes its position relative to the weight holder 3 in the circumferential direction of rotation, and thereby the weight 4 is disposed in a position in which it suppresses whirling motion of the tool chuck 2. In this embodiment, an elastic material such as rubber is attached to each of the stopper faces 12*b* as a buffer member 13 for absorbing the shock of an impact between the weight 4 and stopper face 12*b* when the tool chuck 2 begins rotating or stops rotating. Further, as shown in FIG. 3, the pressing face 4*b*' of each weight 4 is pressed against the guide face 12*a* of the weight holder 3 so as to be capable of relative sliding movement by component Fa of the centrifugal force F, in which the component Fa acts orthogonally to the pressing face 4*b*' and guide face 12*a*, and each weight 4 is pressed against the receiving portion 7*a*' of the weight holder 3 so as to be capable of relative sliding movement by component Fb of the centrifugal force F, in which the component Fb acts along the pressing face 4*b*' and guide face 12*a*.

According to the above-mentioned embodiment, during the rotation of the tool chuck 2, the weight 4 is pressed against the guide face 12*a* which is positioned at the outward side in the diametrical direction and against the pressing face 4*b*' which is positioned at the one side in the axial direction by the centrifugal force, and thus fluctuation of the weight 4 in the axial direction caused by an impact acting upon the tool chuck 2 is prevented such that vibration in the tool chuck 2 caused by such an impact can be suppressed. Further, by means of both the weight 4 and the fluid material 31 in each fluid material storage chamber 30, whirling motion of the tool chuck 2 is suppressed such that vibration can be decreased; and the fluid material 31 moves rapidly when an impact acts upon the tool chuck 2, and thus fluctuations are unlikely to be transmitted to the weight 4 such that vibration can be attenuated. Thus when a work is machined by a tool attached to the tool chuck 2 with this compact balancer 1, precision can be improved and surface roughness reduced; moreover, noise generated from the bearing portion of a machine tool spindle to which the tool chuck 2 is attached is reduced so that silent environment can be achieved, and the life of the bearing portion can be lengthened. When, for example, a tool was attached to the tool chuck 2 and the tool chuck 2 was rotated at a rotational speed of 10,000 rpm and above, the amplitude could be suppressed to less than 1 μm even at critical speed.

FIGS. 4(1), 4(2), and 4(3) illustrate a first modified example of the present invention. In this first modified example, a groove 4*h* which divides the surface of the outer circumferential wall 4*b* of the weight 4 into four regions is provided, and each of the regions defined by this groove 4*h* can be pressed against the guide face 12*a* as a pressing face 4*b*'. In so doing, the pressing face 4*b*' can be pressed against the guide face 12*a* with stability. In this case, the surface area of each of the regions serving as the pressing face 4*b*' can be set to an extremely small value. Further, the rotary body which is integrated with the weight holder is not limited to a tool chuck 2, but can be any rotating object such as the spindle of a machine tool, a vehicle axle, the crankshaft of an engine, and others, and also the axial direction of rotation of the rotary body is not limited to a vertical direction, but can be a horizontal direction or inclined direction. All other aspects are similar to the aforementioned embodiment.

Figure 5:
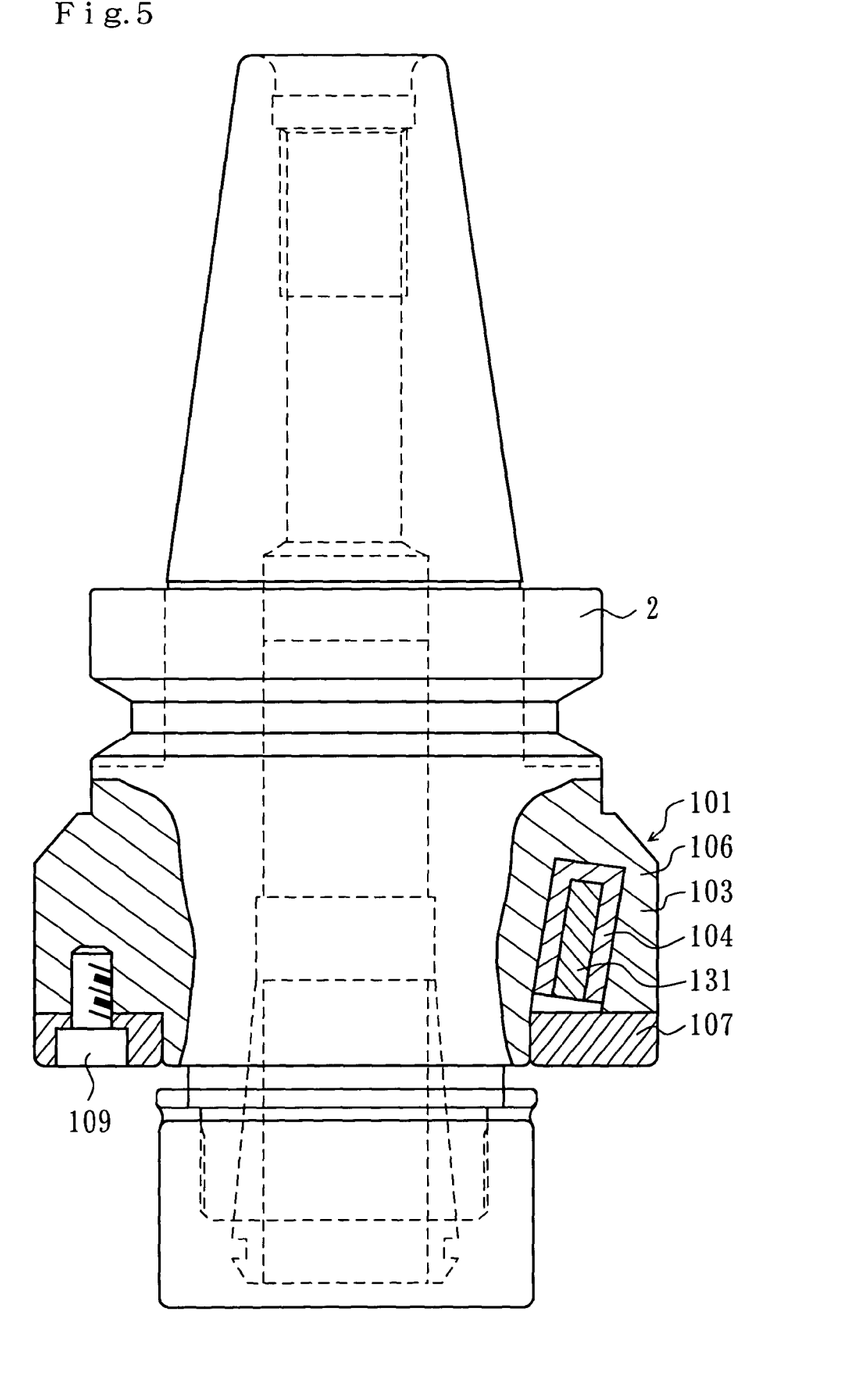
FIG. 5 is a longitudinal section of a balancer according to a second modified example of the present invention.
Figure 6:
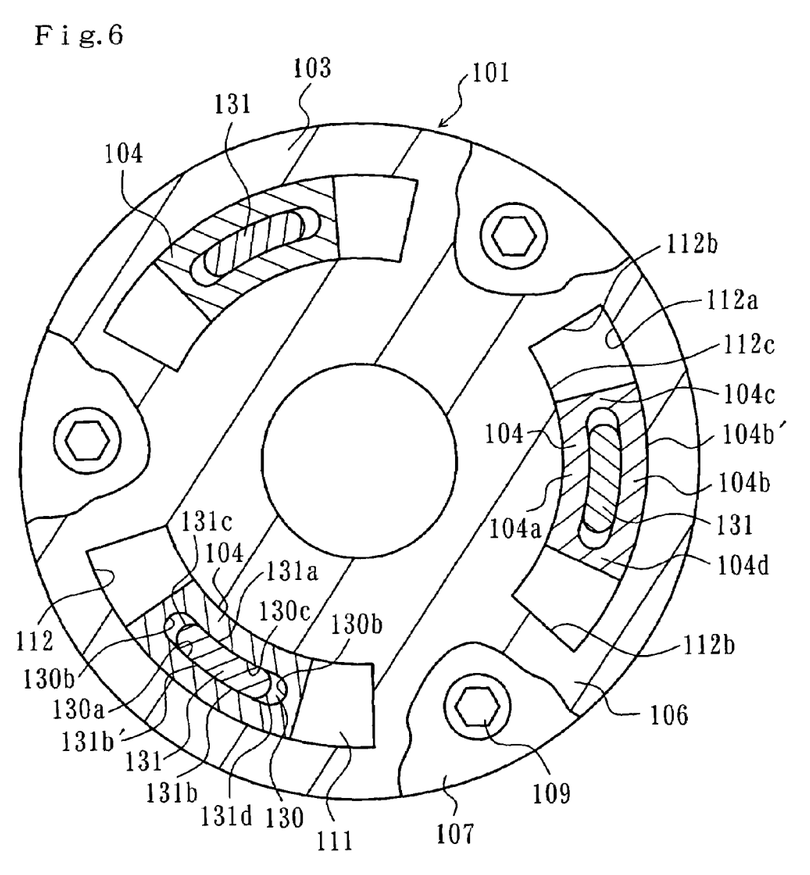
FIG. 6 is a partially cutaway plan view of the balancer according to the second modified example of the present invention.
Figure 7:
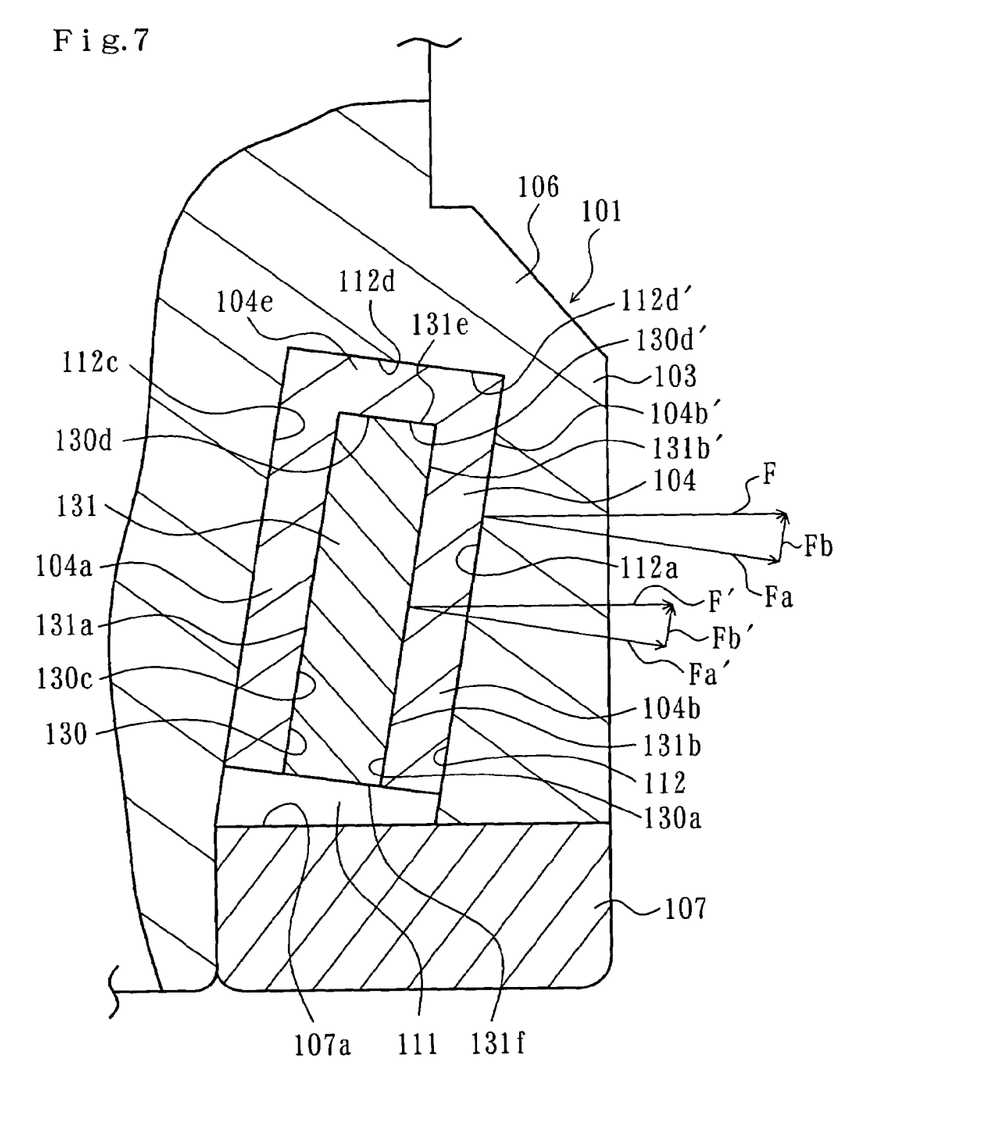
FIG. 7 is a view illustrating the action of the balancer according to the second modified example of the present invention.

FIGS. 5 through 7 illustrate a balancer 101 according to a second modified example of the present invention. In this second modified example, a different weight holder 103 and weight 104 from the weight holder 3 and weight 4 of the aforementioned embodiment are provided, and auxiliary weights 131 are provided in place of the fluid material 31 of the aforementioned embodiment. The number of weights 104 and auxiliary weights 131 is respectively set at three in the second modified example, but there are no particular limitations.

The weight holder 103 comprises a holding portion 106 which is formed monolithically with the outer circumferential portion of the tool chuck 2, and a cover ring 107. The cover ring 107 is connected to the holding portion 106 by bolts 109. Spaces 111 are formed in the weight holder 103 in an equal number to the number of weights 104. The spaces 111 are provided in series at equal intervals in the circumferential direction of rotation of the weight holder 103. Each of the spaces 111 is defined by the inner surface of a hole 112 which is formed in the holding portion 106 so as to be opened in one end thereof, and an end face 107a of the cover ring 107. The inner surface of the hole 112 comprises a guide face 112a which is provided along the circumferential direction of rotation, a face 112c which is provided along the circumferential direction of rotation inward in the diametrical direction from the guide face 112a, a pair of stopper faces 112b which oppose each other at an interval in the circumferential direction of rotation, and a face 112d which opposes the end face 107a of the cover ring 107. The guide face 112a has one end and another end in the circumferential direction of rotation and is formed as a curved surface along an arc which is concentric with the center of rotation of the tool chuck 2. The face 112d which opposes the end face 107a of the cover ring 107 comprises a receiving portion 112d'.

The weights 104 held by the weight holder 103 are hollow having an arcuate slot disposed therein. Each of the weights 104 has inner and outer circumferential walls 104a, 104b which oppose each other at an interval in the diametrical direction of rotation of the weight holder 103, a pair of end walls 104c, 104d which oppose each other at an interval in the circumferential direction of rotation of the weight holder 103, and a lateral, axially extending planar wall 104e which is positioned at one end side in the axial direction of rotation of the weight holder 103. The inner and outer circumferential walls 104a, 104b are provided along the circumferential direction of rotation. Each of the weights 104 is opened at the other end side in the axial direction of rotation of the weight holder 103. The surface of the outer circumferential wall 104b of each weight 104 comprises a pressing surface 104b' which is pressed against the guide face 112a by centrifugal force generated by the rotation of the tool chuck 2.

The guide face 112a, the face 112c which opposes the guide face 112a, the pressing face 104b', and the surface of the inner circumferential wall 104a of the weight 104 are parallel to one another and incline relative to the axial direction of rotation so as to tend to outward side in the diametrical direction of rotation as tending to one side (upward in FIG. 5) in the axial direction of rotation. The receiving portion 112d' is orthogonal to the pressing face 104b' and is positioned at the one side relative to the weight 104 in the axial directions of rotation.

The interior of each of the weights 104 is an auxiliary weight storage chamber 130. An auxiliary weight 131 is stored in each auxiliary weight storage chamber 130 so as to be capable of changing its position in the circumferential direction of rotation of the tool chuck 2. The auxiliary weight storage chamber 130 is defined by an auxiliary guide face 130a provided along the circumferential direction of rotation, a face 130c provided along the circumferential direction of rotation inward in the diametrical direction from the guide face 130a, a pair of stopper faces 130b which are opposed to each other at an interval in the circumferential direction of rotation, and a face 130d which opposes the end face 107a of the cover ring 107. The auxiliary guide face 130a in this modified example has one end and another end in the circumferential direction of rotation and is formed as a curved surface along an arc which is concentric with the center of rotation of the tool chuck 2. The face 130d which opposes the end face 107a of the cover ring 107 comprises an auxiliary receiving portion 130d'.

Each of the auxiliary weights 131 has inner and outer circumferential faces 131a, 131b provided along the circumferential direction of rotation, a pair of end faces 131c, 131d positioned at the two ends in the circumferential direction of rotation, and a pair of side faces 131e, 131f positioned at each end in the axial direction of rotation. The outer circumferential face 131b of each auxiliary weight 131 comprises an auxiliary pressing face 131b' which is pressed against the auxiliary guide face 130a by centrifugal force generated by the rotation of the tool chuck 2.

The auxiliary guide face 130a, the face 130c which opposes the auxiliary guide face 130a, the auxiliary pressing face 131b', and the inner circumferential face 131a of the auxiliary weight 131 are parallel to one another and incline relative to the axial direction of rotation so as to tend to outward side in the diametrical direction of rotation as tending to one side (upward in FIG. 5) in the axial direction of rotation. The auxiliary receiving portion 130d' is orthogonal to the auxiliary pressing face 131b' and is positioned at the one side relative to the auxiliary weight 131 in the axial directions of rotation.

When the tool chuck 2 rotates, the weight 104 which is pressed against the guide face 112a via the pressing face 104b' so as to be capable of relative sliding movement changes its position relative to the weight holder 103 in the circumferential direction of rotation, and thereby the weight 104 is disposed in a position in which it suppresses whirling motion of the tool chuck 2. In this modified example, movement of the weight 104 can be stopped by the stopper faces 112b when the tool chuck 2 begins rotating and stops rotating.

As shown in FIG. 7, the pressing face 104b' of each weight 104 is pressed against the guide face 112a so as to be capable of relative sliding movement by means of component Fa of centrifugal force F acting upon the weight 104, in which the component Fa acts orthogonally to the pressing face 104b' and guide face 112a, and each weight 104 is pressed against the receiving portion 112b' so as to be capable of relative sliding movement by means of component Fb of the centrifugal force F, in which the component Fb acts along the pressing face 104b' and guide face 112a.

Further, the auxiliary pressing face 131b' of each auxiliary weight 131 is pressed against the auxiliary guide face 130a so as to be capable of relative sliding movement by means of component Fa' of centrifugal force F' acting upon the auxiliary weight 131, in which the component Fa' acts orthogonal to the auxiliary pressing face 131b' and auxiliary guide face 130a, and each auxiliary weight 131 is pressed against the auxiliary receiving portion 130d' so as to be capable of relative sliding movement by means of component Fb' of the centrifugal force F', in which the component Fb' acts along the auxiliary pressing face 131b' and auxiliary guide face 130a.

According to the above-mentioned second modified example, during the rotation of the tool chuck 2, the weight 104 is pressed against the guide face 112a which is positioned at the outward side in the diametrical direction and against the pressing face 104b' which is positioned at the one side in the axial directions by the centrifugal force, and thus fluctuations of each weight 104 in the axial direction caused by an impact acting upon the tool chuck 2 can be prevented such that vibration in the tool chuck 2 caused by such an impact can be suppressed. Furthermore, by means of both the weights 104 and the auxiliary weights 131, whirling motion of the tool chuck 2 can be suppressed so that vibration can be decreased. Moreover, since the auxiliary weight 131 is pressed against the auxiliary guide face 130a which is positioned at the outward side in the diametrical direction and against the auxiliary pressing face 131b' which is positioned at the one side in the axial direction by the centrifugal force, fluctuations of each auxiliary weight 131 in the axial direction caused by an impact acting upon the tool chuck 2 can be prevented so that vibration in the tool chuck 2 caused by such an impact can be suppressed. Therefore, when a work is machined by a tool attached to the tool chuck 2 with this compact balancer 101, precision can be improved and surface roughness reduced; moreover, noise generated from the bearing portion of a machine tool spindle to which the tool chuck 2 is attached is reduced so that silent environment can be achieved, and the life of the bearing portion can be lengthened. When, for example, a working tool was attached to the tool chuck 2 and the tool chuck 2 was rotated at a rotational speed of 10,000 rpm or more, the amplitude could be suppressed to less than 1 µm even at resonance point. Also in the above-mentioned second modified example, the guide face 112a and the face 112c which opposes the guide face 112a are parallel to each other, and thus the hole 112 can be opened easily. Further, the weight 104 and auxiliary weight 131 respectively has a simple form and therefore can be easily formed and finished with a high degree of precision, and thus vibration in the tool chuck 2 can be suppressed with a high degree of precision.

Figure 8:
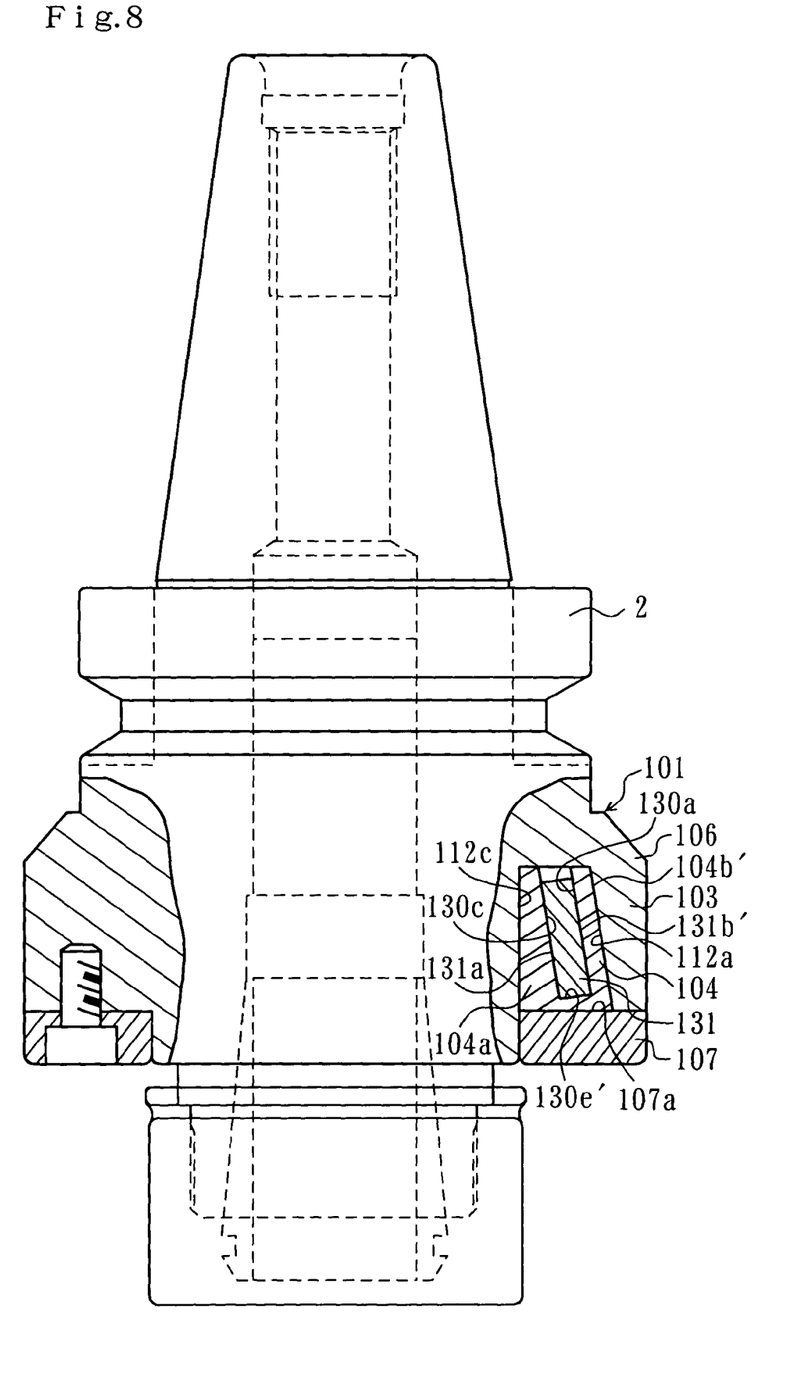
FIG. 8 is a longitudinal section of a balancer according to a third modified example of the present invention.
Figure 9:
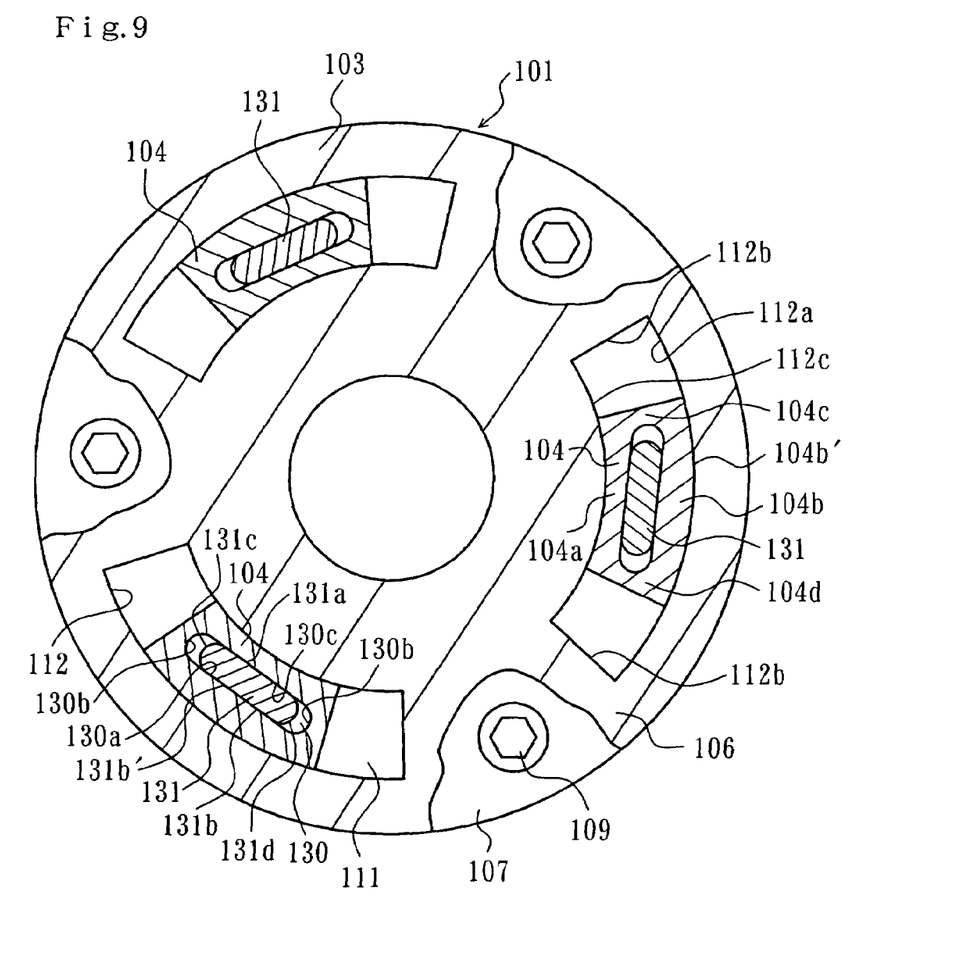
FIG. 9 is a partially cutaway plan view of the balancer according to the third modified example of the present invention.

FIGS. 8 and 9 illustrate a third modified example of the present invention. In this third modified example, the guide face 112a, pressing face 104b', auxiliary guide face 130a, the face 130c which opposes the auxiliary guide face 130a, the auxiliary pressing face 131b', and the inner circumferential face 131a of the auxiliary weight 131 are inclined relative to the axial direction of rotation so as to tend to outward side in the diametrical direction of rotation as tending to downward side in the drawing. The face 112c which opposes the guide face 112a and the surface of the inner circumferential wall 104a of the weight 104 extend along the axial direction of rotation. The end face 107a of the cover ring 107 comprises the receiving portion, and a face 130e' beside the end face 107a of the cover ring 107 in the auxiliary weight storage chamber 130 comprises the auxiliary receiving portion. In the above-mentioned second modified example, since the auxiliary guide face 130a is set as a curved surface along an arc which is concentric with the center of rotation of the tool chuck 2, the distance from the auxiliary guide face 130a to the center of rotation of the tool chuck 2 is constant at the two ends thereof and between the two ends thereof in the circumferential direction of rotation. Unlike this, in this third modified example, the distance from the auxiliary guide face 130a to the center of rotation of the tool chuck 2 gradually decreases in the circumferential direction of rotation from the two ends toward the central point between the two ends, since the auxiliary guide face 130a is formed as a flat surface parallel to the axial direction of rotation. The face 130c which opposes the auxiliary guide face 130a, the auxiliary pressing face 131b', and the inner circumferential face 131a of the auxiliary weight 131 are also formed as flat surfaces parallel to the auxiliary guide face 130a. All other aspects are similar to the second modified example and identical components are allocated identical reference symbols. Hence the centrifugal force which acts upon the auxiliary weight 131 gradually decreases in the circumferential direction of rotation from the two ends of the auxiliary guide face 130a toward the central point between the two ends thereof such that displacement of the auxiliary weight 131 is facilitated, and thus the auxiliary weight 131 can be quickly positioned in a position in which it compensates unbalance in weight distribution.

Figure 10:
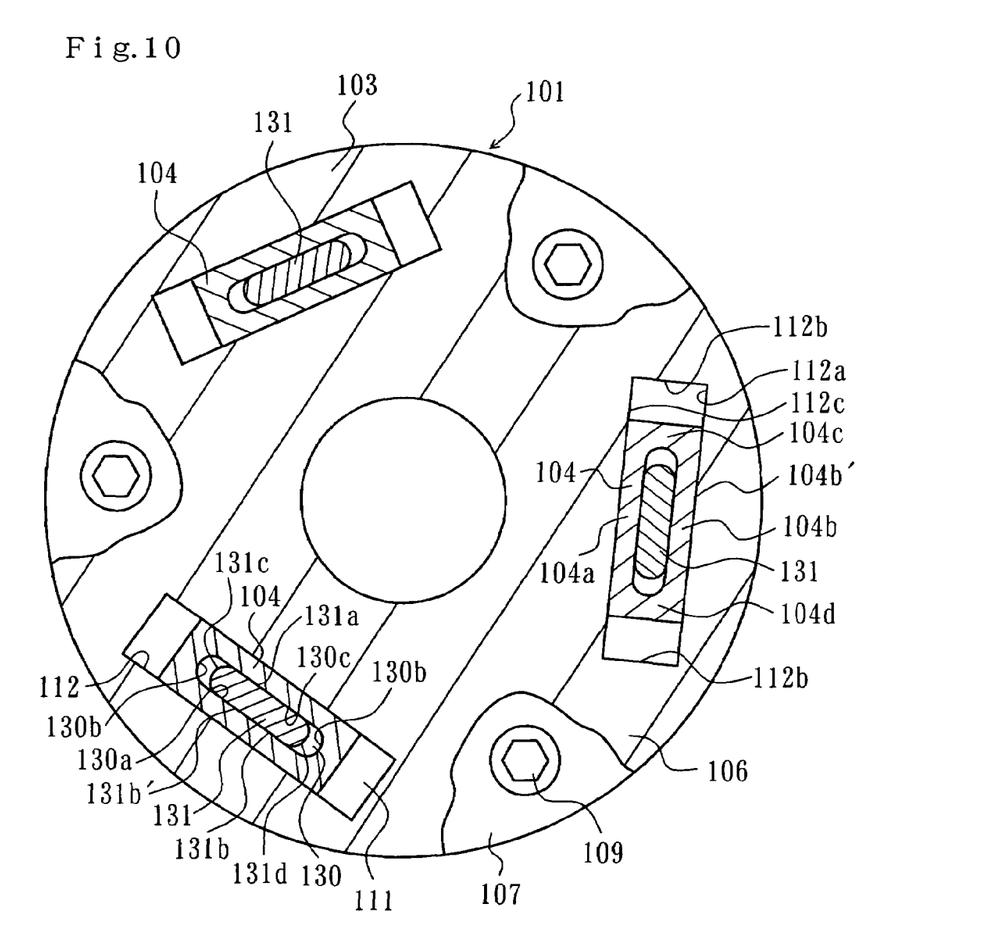
FIG. 10 is a partially cutaway plan view of a balancer according to a fourth modified example of the present invention.

FIG. 10 illustrates a fourth modified example of the present invention. In the above-mentioned third modified example, since the guide face 112a is set as a curved surface along an arc which is concentric with the center of rotation of the tool chuck 2, the distance from the guide face 112a to the center of rotation of the tool chuck 2 is constant at the two ends thereof and between the two ends thereof in the circumferential direction of rotation. Unlike this, in this fourth modified example, the distance from the guide face 112a to the center of rotation of the tool chuck 2 gradually decreases in the circumferential direction of rotation from the two ends toward the central point between the two ends, since the guide face 112a is formed as a flat surface parallel to the axial direction of rotation. The face which opposes the guide face 112a, the pressing face 104b', and the surface of the inner circumferential wall 104a of the weight 104 are also formed as flat surfaces parallel to the guide face 112a. Hence the centrifugal force which acts upon the weight 104 gradually decreases in the circumferential direction of rotation from the two ends of the guide face 112a toward the central point between the two ends thereof such that displacement of the weight 104 is facilitated, and thus the weight 104 can be quickly positioned in a position in which it compensates unbalance in distribution. All other aspects are similar to the third modified example and identical components have been allocated identical reference symbols.

The present invention is not limited to the aforementioned embodiment and modified examples. For example, the guide face can be formed as a single surface provided roundly along the circumferential direction. Further, the guide face 112a and auxiliary guide face 130a can be formed as convex curved surfaces having an opposite orientation to an arc which is concentric with the rotational center of the tool chuck 2. The holding portion 106 in the second through fourth modified examples can be formed in an annular form and as a separate component to the tool chuck 2 similarly to the embodiment, and can be integrated with the tool chuck 2 by screws similarly to the embodiment or integrated with the tool chuck 2 by shrink fitting. Also in the second through fourth modified examples, the auxiliary guide face and auxiliary pressing face can be formed parallel to the rotational axis. In the embodiment and the modified examples, the guide face and pressing face can be parallel relative to the rotational axis. In the embodiment and the first modified example, the fluid material can be removed, and in the second through fourth modified examples the auxiliary weights can be removed.

The invention claimed is:

1. A balancer comprising:
a weight holder which is integrated with a rotary body; and
a weight which is held by the weight holder;
wherein:
the weight holder has a guide face provided along the circumferential direction of rotation;
the weight has a pressing face which is pressed against the guide face by centrifugal force generated by rotation of the rotary body; and
when the rotary body rotates, the weight which is pressed against the guide face via the pressing fate changes its position relative to the weight holder in the circumferential direction of rotation, and thereby the weight is disposed in a position in which it suppresses whirling motion of the rotary body,
wherein:
an auxiliary weight storage chamber is provided;
an auxiliary weight is stored in the auxiliary weight storage chamber so as to be capable of changing its position in the circumferential direction of rotation of said rotary body;
the auxiliary weight storage chamber has an auxiliary guide face provided along the circumferential direction of rotation;
the auxiliary weight has an auxiliary pressing face which is pressed against the auxiliary guide face by centrifugal force generated by rotation of the rotary body;
the auxiliary guide face and auxiliary pressing face are inclined relative to the axial direction of rotation so as to rend to outward side in the diametrical direction of rotation as tending to one side in the axial direction of rotation;
an auxiliary receiving portion which is positioned at the one side relative to the auxiliary weight in the axial direction of rotation is provided on the auxiliary weight storage chamber; and
the auxiliary weight is pressed against the auxiliary receiving portion by a component of the centrifugal force, in which the component acts along the auxiliary guide face and the auxiliary pressing face.

2. The balancer according to claim 1, wherein the auxiliary guide face has one end and another end in the circumferential direction of rotation, and the distance from the auxiliary guide face to the rotational center of the rotary body gradually decreases in the circumferential direction of rotation from the two ends of the auxiliary guide face toward the central point between the two ends thereof.

3. A balancer comprising:
a weight holder which is integrated with a rotary body, said weight holder including a plurality of holes;
a plurality of weights, each respectively being slidably disposed in one of said holes;
each of said holes having an inner surface which comprises a guide face and each of said respective weights including a pressing face which opposes each guide face;
the guide face and pressing face being inclined at an angle of incline relative to the axial direction of rotation, the angle of incline being set so that a component of centrifugal force acts along the guide face and pressing face and an other component of centrifugal force acts orthogonally to the guide face and the pressing race during rotation; and a receiving portion being provided on said inner surface of each of said holes, each weight being pressed against each respective receiving portion by said component of centrifugal force during rotation;
each pressing face being pressed against each respective guide face by said other component of centrifugal force during rotation; and
when the rotary body rotates, each of the weights is disposed in a position in which suppresses whirling motion of the rotary body, wherein:
each of said plurality of weights further comprises an auxiliary weight storage chamber:
each auxiliary weight storage chamber including an auxiliary weight slidably disposed therein, the size along a circumferential direction of each auxiliary weight storage chamber being greater than that of each respective auxiliary weight; and
wherein when the rotary body rotates, each auxiliary weight is disposed in a position which suppresses whirling motion of the rotary body.

4. A balancer comprising:
a weight holder which is integrated with a rotary body, said weight holder including a plurality of holes; and
a plurality of weights, each respectively being slidably disposed in one of said holes, the size along a circumferential direction of each hole being greater than that of each respective weight;
each of said holes having an inner surface which comprises a guide face and each of said weights including a pressing face which opposes to the guide face;
each of said a plurality of weights including an auxiliary weight storage chamber;
each auxiliary weight storage chamber including an auxiliary weight slidably disposed therein, the size in a circumferential direction of each auxiliary weight storage chamber being greater than that of each respective auxiliary weight;
each pressing face is pressed against each respective guide face by centrifugal force generated by rotation of the rotary body; and
when the rotary body rotates, each of said plurality of weights and each auxiliary weight is disposed in a position which suppresses whirling motion of the rotary body.

5. The balancer of claim 4, wherein said receiving portion extends orthogonally from said guide face.

6. The balancer according to claim 3 or 4, wherein each guide face extends along first and second directions, the first direction being the circumferential direction of rotation and the second direction being inclined to the axial direction of rotation.

7. The balancer of claim 6, wherein when the rotary body rotates, the pressing face of the weight is pressed against the guide face and the weight slides along the first and second directions relative to the weight holder.

8. The balancer according to claim 6, wherein each of said weights has an axially extending planar wall and each receiving portion extends from said guide face.

9. The balancer according to claim 3 or 4, wherein each of said weights has a non-spherical shape.

10. The balancer according to claim 3 or 4, wherein each auxiliary weight has a non-spherical shape.

11. The balancer according to claim 3 or 4, wherein:
each guide face extends along first and second directions, the first direction being the circumferential direction of rotation and the second direction being inclined to the axial direction of rotation; and
each auxiliary weight is slidably disposed in each respective auxiliary weight storage chamber so as to be capable of sliding along the first direction relative to a respective one of said weights.

12. The balancer of claim 11 wherein:

when the rotary body rotates, the pressing face of the weight is pressed against the guide face and the weight slides along the first and second directions relative to the weight holder; and the auxiliary weight is stored in the auxiliary weight storage chamber so as to he capable of sliding along the first and second directions relative to the weight.

13. The balancer according to claim 3 or 4, wherein the guide face has one end and another end in the circumferential direction of rotation, and the distance from the guide face to the rotational center of the rotary body gradually decreases in the circumferential direction of rotation from the two ends of the guide face toward the central point between the two ends thereof.

\* \* \* \* \*